March 13, 1956 T. A. BILLINGS 2,737,732
LAND CLEARING RAKE

Filed Aug. 14, 1953 2 Sheets-Sheet 1

INVENTOR.
Thomas A. Billings
BY
Nathaniel Frucht
ATTORNEY

March 13, 1956 T. A. BILLINGS 2,737,732
LAND CLEARING RAKE
Filed Aug. 14, 1953 2 Sheets-Sheet 2

INVENTOR.
Thomas A. Billings
BY
Nathaniel Frucht
ATTORNEY

United States Patent Office 2,737,732
Patented Mar. 13, 1956

2,737,732

LAND CLEARING RAKE

Thomas A. Billings, Providence, R. I.

Application August 14, 1953, Serial No. 374,281

6 Claims. (Cl. 37—2)

The present invention relates to a heavy duty land clearing rake and has particular reference to a removable tooth construction therefor.

The principal object of the invention is to provide a heavy duty land clearing rake for detachable mounting on bulldozers and the like, which has removable heavy duty teeth.

Another object of the invention is to provide a heavy duty land clearing rake having adjustable spaced heavy duty teeth.

An additional object of the invention is to provide a heavy duty land clearing rake having adjustably spaced heavy duty teeth supported against lateral and pivotal thrust.

A further object of the invention is to provide heavy duty teeth for a heavy duty land clearing rake with replaceable wear points.

An additional object of the invention is to provide a heavy duty land clearing rake with heavy duty teeth having integral mounting plates, for removably mounting the teeth on the rake.

Another object of the invention is to provide a heavy duty land clearing rake having heavy duty teeth made of a material to withstand substantial strains and stresses, the teeth having wearing points of a different material to withstand wear and tear.

A further object of the invention is to provide a well balanced heavy duty land clearing rake having heavy duty teeth shaped to effectively utilize the maximum driving power of the motivating vehicle to which the rake is attached.

With the above and other objects and advantageous features in view, the invention consists of a novel arrangement of parts, more fully disclosed in the detailed description following, in conjunction with the accompanying drawings, and more specifically defined in the claims appended thereto.

It has been found advisable to provide a rake for clearing land which is detachably secured to a bulldozer, tractor, or the like, and which is so ruggedly constructed that it withstands very heavy duty abuses as when clearing heavily wooded land.

To this end, I provide a steel frame which may be secured to a bulldozer or the like, the frame preferably including a boxed H-beam having a face plate with upper and lower flanges and spaced parallel slots, whereby a series of teeth may be detachably mounted to the face plate in any desired spaced relation. I further lock the upper portions of the teeth against pivotal or lateral movement by means of U-braces or the like which are locked to upstanding webs attached to and preferably welded to the upper surface of the boxed H-beam, and I provide the lower point portion of each tooth with a replaceable wear shield, whereby the teeth remain rigidly in place and the effects of wear on the teeth are quickly remedied.

Figure 4:
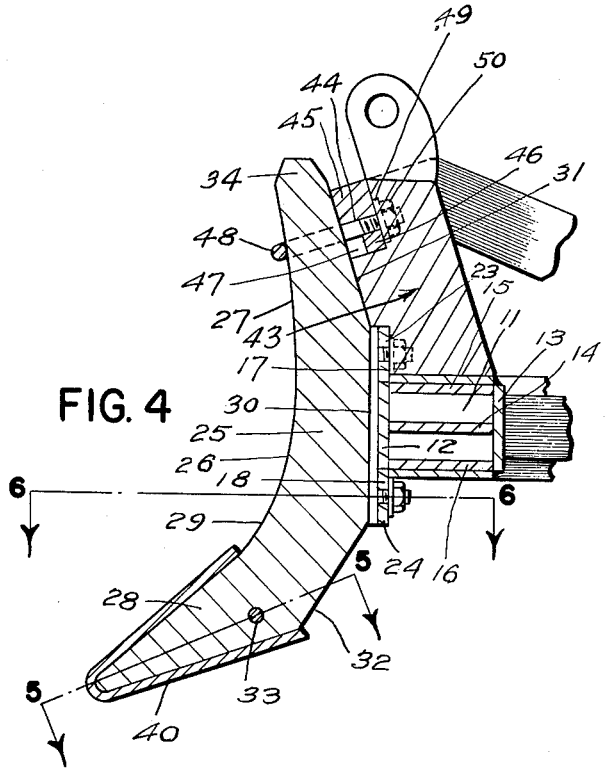
Fig. 4 is an enlarged sectional detail on the line 4—4 of Fig. 3.
Figure 5:
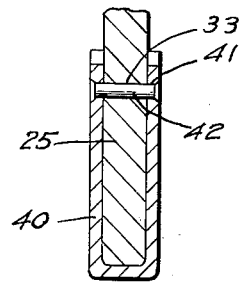
Fig. 5 is a section on the line 5—5 of Fig. 4.
Figure 6:
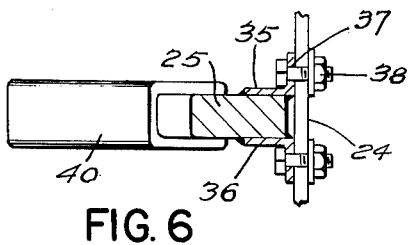
Fig. 6 is a section on the line 6—6 of Fig. 4.

Referring to the drawings, the steel frame 10 includes an H-beam 11 with a face plate 12 and rear plate 13, see Fig. 4, the web 14 of the beam being perpendicular to the face plate to provide substantial resistance to impact and shock. I preferably box the beam by welding an upper plate 15 and a lower plate 16 thereto, and I widen the face plate by welding upper and lower flange bars 17, 18 thereto. I also provide two spaced parallel longitudinal slots 19, 20 by welding end plates 21, 22 to the ends of the beam, and welding bars 23, 24, to the end plates 21, 22 in spaced relation to the flange bars 17, 18.

Teeth 25, see Fig. 4, are provided having median portions 26, upper portions 27, and lower thrust points 28, the outer or forward surfaces 29 of the teeth being preferably arcuate as illustrated, the rear surfaces 30 of the median portions being flat, the rear surfaces 31 of the upper portions being flat and inclined forwardly with respect to the surfaces 30, and the rear surfaces 32 of the points being angular with an intermediate obtuse angle and being inclined forwardly of the surfaces 30. Each point has a transverse bore 33 positioned generally centrally and rearwardly as shown, and each upper portion 27 has its upper end 34 reduced, for a purpose hereinafter described.

Figure 2:
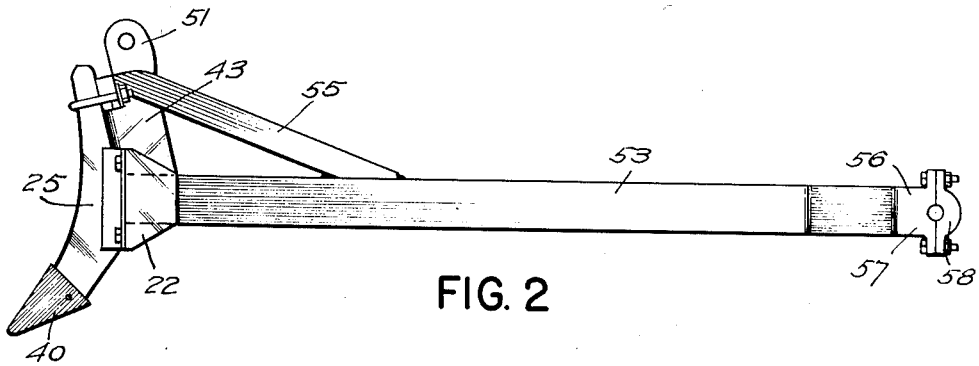
Fig. 2 is a side view of the rake construction of Fig. 1.
Figure 3:
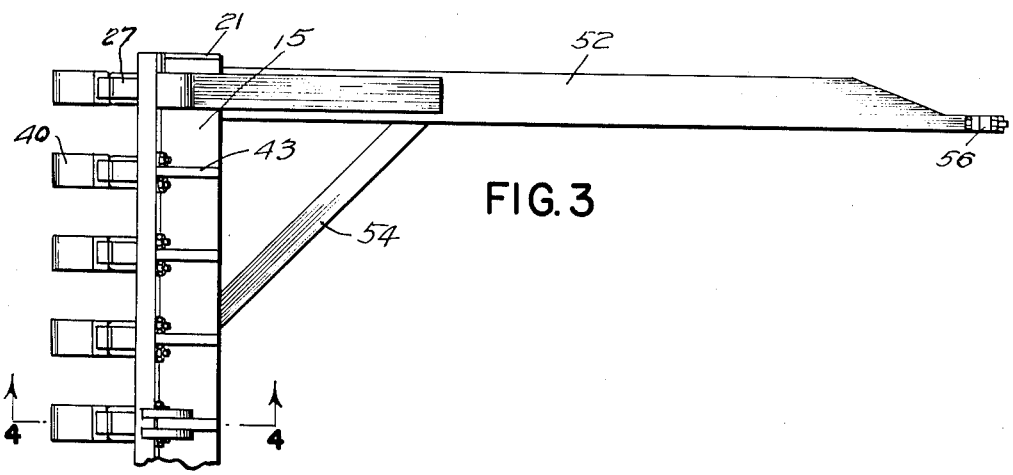
Fig. 3 is a top view of the rake construction of Fig. 1, parts being broken away.

Each tooth is provided with angle plates 35, 36 welded to the sides at the median portion thereof, the angle plates 35, 36 having bolt openings 37 whereby bolts 38 may extend through the openings 37 and through the longitudinal slots 19, 20 for locking the teeth to the beam front plate in desired spaced relation. The teeth are preferably of an alloy steel of great toughness, to withstand impact and shock, and are provided with wear sleeves 40, see Fig. 2, shaped to fit the teeth points and made of a ferrous alloy having great wear resistance. The sleeves 40 have side openings 41 aligned with the tooth point bores 33, whereby rivets 42 may be mounted therethrough to lock the shields to the teeth.

Since the rake is to be used for heavy duty, the teeth are supported and buttressed against pivotal and lateral movement by welding upright webs 43 at spaced intervals along the upper plate 15 of the beam, the webs being forwardly inclined and having upper right angled recesses 44 in which an upper cross bar 45 and a smaller lower cross bar 46 are welded to the webs to provide a longitudinal upper slot 47 between the cross bars, whereby U-straps 48 are seated over the reduced upper teeth portions 27 to extend through the slot 47 at the web sides and to be locked in place against the bars, which provide an abutment for the upper portions of the teeth, 45, 46 by washers 49 and nuts 50, the washers 49 being preferably bent or upset at their lower ends after locking to eliminate any pivotal effect. The cross bar 45 preferably has its forward face in the same plane as the forward faces of the webs, whereby the teeth are locked against the upper portions of the webs 43, but the teeth may be displaced laterally of the webs for less heavy duty, as they are firmly locked to the cross bars 45, 46.

Figure 1:
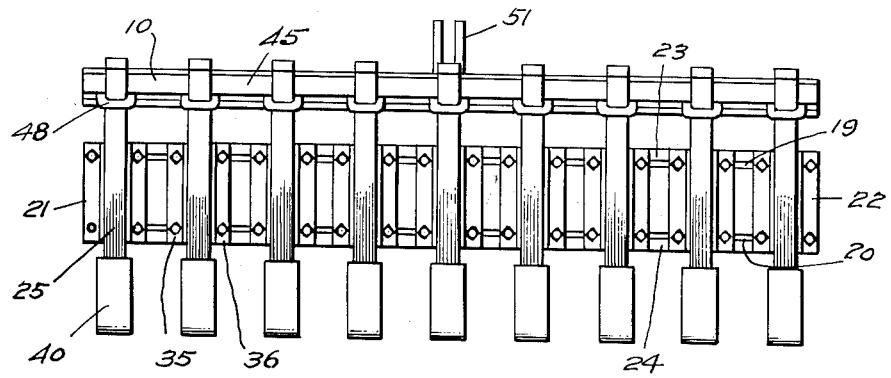
Fig. 1 is a front view of an illustrative embodiment of my novel rake construction.

The center web 43 is preferably provided with lifting hooks 51, see Fig. 1, and the frame may be secured to the usual side supports of a tractor or bulldozer in customary manner. It is, however, desirable to provide size rails 52, 53 which are welded to the ends of the H-beam, and which have angularly positioned tension bars 54, 55 respectively welded to the H-beam and to the end webs, to provide a very rigid structure. Each side rail has a split bearing 56 at its free end comprising a recessed portion 57 and a bolt secured cap portion 58 to receive the cross shaft of a tractor or bulldozer.

It is now clear that my novel construction provides a land clearing rake which is effective to perform heavy duty work as in clearing rocky and heavily wooded land. The teeth are for withstanding substantial shock strains and stresses and are adjustably set in spaced relation in accordance with the work to be done. The replaceable wear shields on the teeth are made of a ferrous alloy having great resistance to abrasion and wear, thus reducing the cost of repair and maintenance while maintaining the efficiency of the rake. The position, shape, spacing and mounting of individual teeth to the rake, and the general overall construction of the rake, provide a well-balanced rake through which the maximum push is exerted in clearing land when used with a tractor, bulldozer, or the like.

Although I have disclosed a specific constructional embodiment of my invention, it is obvious that changes in the size, shape, and arrangement of the parts may be made to meet other rake requirements, without departing from the spirit and the scope of the invention as defined in the appended claims.

I claim:

1. In a heavy duty rake, a steel frame comprising a horizontal boxed H-beam having a face plate with the upper and lower flanges, an end plate at each end of the beam, horizontal bars secured to the end plates in spaced parallel relation to the face plate flanges, whereby horizontal slots are provided above and below the beam, upstanding webs welded at spaced intervals to the upper surface of the beam, a horizontal abutment cross bar secured to the forward edges of the webs in spaced relation to the upper horizontal bar, teeth having median sections seated on the face plate, securing means for said teeth extending through the horizontal slots, said teeth having lower thrust points and upper portions seated on the abutment bar, and means locking the upper teeth portions to the abutment bar.

2. In the combination of claim 1, said webs being forwardly inclined and said teeth upper portions being forwardly inclined to seat on the front faces of the webs.

3. In the combination of claim 2, said webs having upper recesses, said abutment bar being seated in the recesses with its forward surface in the plane of the forward faces of the webs.

4. In the combination of claim 3, a second cross bar in said recesses and secured to the webs in spaced relation to the abutment bar, whereby a horizontal slot is provided.

5. In the combination of claim 4, said means locking the upper teeth portions to the abutment bar including straps over the upper teeth portions, said straps extending through the horizontal slot between the abutment bar and the second cross bar.

6. In the combination of claim 5, said teeth being spaced to seat the upper portions thereof on the web faces and the contiguous forward surface of the abutment bar.

References Cited in the file of this patent

UNITED STATES PATENTS

| | | |
|---|---|---|
| 2,371,549 | Sembler et al. | Mar. 13, 1945 |
| 2,625,870 | Peacock et al. | Jan. 20, 1953 |

FOREIGN PATENTS

| | | |
|---|---|---|
| 471,535 | Canada | Feb. 13, 1951 |